US007286842B2

(12) United States Patent
Li et al.

(10) Patent No.: US 7,286,842 B2
(45) Date of Patent: Oct. 23, 2007

(54) METHOD AND APPARATUS FOR SUPPORTING DIRECT LINK COMMUNICATION IN TDD CDMA SYSTEM

(75) Inventors: Yueheng Li, Shanghai (CN); Sun Li, Shanghai (CN)

(73) Assignee: Koninklijke Philips Electronics, N.V., Eindhoven (NL)

( * ) Notice: Subject to any disclaimer, the term of this patent is extended or adjusted under 35 U.S.C. 154(b) by 0 days.

(21) Appl. No.: 10/551,967

(22) PCT Filed: Mar. 29, 2004

(86) PCT No.: PCT/IB2004/050354

§ 371 (c)(1),
(2), (4) Date: Oct. 5, 2005

(87) PCT Pub. No.: WO2004/091238

PCT Pub. Date: Oct. 21, 2004

(65) Prior Publication Data

US 2006/0245398 A1    Nov. 2, 2006

(30) Foreign Application Priority Data

Apr. 11, 2003   (CN)   ............................. 03 1 10415

(51) Int. Cl.
*H04B 7/00* (2006.01)
*H04B 15/00* (2006.01)

(52) U.S. Cl. .................. 455/502; 455/522; 455/509; 455/515; 455/516; 455/518; 455/526; 455/415; 455/416; 455/422; 455/455; 455/3.05; 455/90.2; 455/90.3; 370/278; 370/280; 370/311; 370/330; 370/335; 370/336; 370/337; 370/342

(58) Field of Classification Search .............. 455/502, 455/517, 522, 509, 511, 514, 515, 516, 518, 455/519, 526, 415, 416, 428, 455, 3.05, 90.2, 455/90.3; 370/278, 280, 311, 330, 335, 337, 370/336, 342

See application file for complete search history.

(56) References Cited

U.S. PATENT DOCUMENTS

| 5,636,243 | A | * | 6/1997 | Tanaka ........................ 375/219 |
| 5,995,844 | A | * | 11/1999 | Fukuda ....................... 455/462 |
| 6,415,146 | B1 | * | 7/2002 | Capece ........................ 455/517 |
| 6,459,690 | B1 | * | 10/2002 | Le Strat et al. ............. 370/332 |
| 6,574,266 | B1 | * | 6/2003 | Haartsen ....................... 375/133 |
| 7,079,509 | B2 | * | 7/2006 | Belcea ......................... 370/330 |
| 7,082,108 | B2 | * | 7/2006 | Hwang et al. ............... 370/311 |
| 7,088,688 | B2 | * | 8/2006 | Kim et al. .................... 370/280 |
| 2006/0153105 | A1 | * | 7/2006 | Jia et al. ...................... 370/378 |
| 2006/0166688 | A1 | * | 7/2006 | Sun et al. .................... 455/502 |
| 2006/0229092 | A1 | * | 10/2006 | Jia et al. ...................... 455/517 |
| 2006/0258382 | A1 | * | 11/2006 | Zhang et al. ................ 455/501 |
| 2006/0258383 | A1 | * | 11/2006 | Jiang et al. .................. 455/502 |

FOREIGN PATENT DOCUMENTS

WO    0101717 A    1/2001

* cited by examiner

*Primary Examiner*—Matthew Anderson
*Assistant Examiner*—Shaima Q. Aminzay

(57) ABSTRACT

A method for supporting P2P communication between two user equipments in TDD CDMA systems, performed by user equipment, comprising: receiving signals transferred via the downlink control channel from network system; acquiring the timeslot allocation information and the spreading code allocation information of other active user equipments allocated in the specific downlink timeslot associated with the direct link used by said user equipments, according to the received signals; and synchronizing the P2P communication signals received by the user equipment and signals from network system, according to the acquired timeslot allocation information and spreading code allocation information, so as to reduce the interference caused by the downlink signals transmitted from network system to other user equipments during the P2P communication process.

12 Claims, 8 Drawing Sheets

| Bit 7 | Bit 6 | Bit 5 | Bit 4 | Bit 3 | Bit 2 | Bit 1 | Bit 0 |
|---|---|---|---|---|---|---|---|
|  | TS0 | TS1 | TS2 | TS3 | TS4 | TS5 | TS6 |

Fig. 6

| Bit 15 | Bit 14 | Bit 13 | Bit 12 | Bit 11 | Bit 10 | Bit 9 | Bit 8 |
|---|---|---|---|---|---|---|---|
| Code 15 | Code 14 | Code 13 | Code 12 | Code 11 | Code 10 | Code 9 | Code 8 |
| Bit 7 | Bit 6 | Bit 5 | Bit 4 | Bit 3 | Bit 2 | Bit 1 | Bit 0 |
| Code 7 | Code 6 | Code 5 | Code 4 | Code 3 | Code 2 | Code 1 | Code 0 |
| Bit 15 | Bit 14 | Bit 13 | Bit 12 | Bit 11 | Bit 10 | Bit 9 | Bit 8 |
| Code 15 | Code 14 | Code 13 | Code 12 | Code 11 | Code 10 | Code 9 | Code 8 |
| Bit 7 | Bit 6 | Bit 5 | Bit 4 | Bit 3 | Bit 2 | Bit 1 | Bit 0 |
| Code 7 | Code 6 | Code 5 | Code 4 | Code 3 | Code 2 | Code 1 | Code 0 |

Fig. 7

METHOD AND APPARATUS FOR SUPPORTING DIRECT LINK COMMUNICATION IN TDD CDMA SYSTEM

FIELD OF THE INVENTION

The present invention relates to a method and apparatus for supporting P2P communication in TDD CDMA (Time-Division-Duplex Code-Division-Multiple-Access) communication systems, and more particularly, to a method and apparatus for reducing interference caused by conventional communication signals to a UE (user equipment) during P2P communication process in TDD CDMA communication systems.

BACKGROUND ART OF THE INVENTION

In conventional cellular mobile communication systems, a UE (user equipment) has to communicate with another UE only through the relaying of base stations even if the two UEs are very close to each other. FIG. 1 illustrates the conventional communication mode. However, in some cases when the distance between two UEs who camp on the same cell is very close, it can be a more reasonable way for them to communicate directly, rather than through the relaying of base stations. This method is the so-called peer-to-peer communication, abbr. as P2P.

FIG. 2 illustrates the P2P communication between two UEs. Referring to FIG. 2, assume that the two UEs are camping in the same cell and the distance between them satisfies the requirement for establishing P2P connection, the dashed line represents signaling link between the UTRAN and the UE during P2P communication, the solid line for data link between the two UEs, and the arrowhead for direction of information flow. It can be obviously seen from the figure that only signaling link exists between the UTRAN and the UE, while only data link exists between the two communicating UEs. If additional signal overhead for management is ignored, P2P communication can save about 50% radio resource during the process of direct link. Furthermore, control channels are reserved between the UTRAN and the UEs, so wireless network operators still holds control through the base station over how the UEs utilize radio resources.

It is commonly accepted that a Time Division Duplex (TDD) air interface is a communication standard that offers a more flexible adaptation to different uplink and downlink traffic requirements. Among existing 3G systems based on TDD communication mode, TD-SCDMA (Time Division-Synchronization Code Division Multiple Access) system is the most suitable system for the combination of P2P communication with conventional communication mode, because the same carrier frequency is applied in both uplink and downlink communications, which can simplify the RF (Radio Frequency) module of the mobile terminal.

In a TD-SCDMA system that is capable of employing P2P communication mode, the DIRECT mode is introduced to describe the direct communication between two UEs, besides two other working modes—IDLE mode and CONNECT mode defined in conventional TD-SCDMA system. The communication link in direct mode can be defined as FORWARD link (e.g.: the link from UE1 to UE2) and BACKWARD link (e.g.: the link from UE2 to UE1) identified according to the information flow direction for one UE to send signals to the other UE or receive signals from the other UE. Because P2P communication mode is constructed in combination with existing TD-SCDMA systems, the UTRAN, the P2P UEs and other conventional UEs allocated in the same timeslot can overhear the information transferred on the FORWARD link or BACKWARD link, i.e.: from the view of the UTRAN, even though the UEs have no connection with the UTRAN, the FORWARD link and BACKWARD link are associated with a certain uplink timeslot or downlink timeslot (the FORWARD link and BACKWARD link can correspond to different uplink timeslot or downlink timeslot depending on different resource allocation schemes). Hence P2P communication will cause signal interference to conventional communication. Similarly, two P2P UEs can also overhear the information transferred in the uplink timeslot or downlink timeslot associated with its FORWARD link or BACKWARD link during P2P communication. Therefore, when conventional links share the same timeslots with the P2P links, conventional uplink or downlink communication will interfere with the communication of the P2P FORWARD link or BACKWARD link, which seriously deteriorates the performance of P2P-enabled TDD CDMA communication systems.

To improve the performance of P2P-enabled TDD CDMA communication systems, it's necessary to effectively reduce the signal interference caused by P2P communication mode to the TD-SCDMA communication systems. First of all, analysis will go to the interference signal brought by introducing P2P communication mode in the following, and then how to reduce interference signal will be described. For simplicity in the following, the timeslot in which one UE transmits signals to the other UE through the above FORWARD link or BACKWARD link is called transmit timeslot (Tx timeslot), while the timeslot in which the UE receives signals from said another UE through the above FORWARD link or BACKWARD link is called receive timeslot (Rx timeslot), wherein the Tx timeslot or Rx timeslot is associated with an uplink timeslot or downlink timeslot in the sub-frame in conventional communication respectively.

1. Interference Associated with Uplink Timeslot between P2P Link and Conventional Link FIG. 3 illustrates the interferences between P2P link and conventional link in P2P-enabled TD-SCDMA systems when the P2P link is associated with uplink timeslot. As shown in FIG. 3, it is assumed that UE1 and UE2 work in P2P mode and UE3 works in conventional mode, wherein UE1's Tx timeslot is associated with UE3's uplink timeslot, that is, UE1 and UE3 are allocated in the same uplink timeslot to transmit signals respectively to UE2 and the UTRAN. S1 is the information from UE1 to UE2 through direct link (taken as FORWARD link) and S2 is uplink information from UE3 to the UTRAN through uplink, moreover, S1 and S2 are associated with the same uplink timeslot but with different spreading codes.

In TD-SCDMA communication systems, one of the most important features is to maintain uplink synchronization, which means signals from different UEs should arrive at the UTRAN at the same time to guarantee the orthogonality of the spreading codes of signals from the main paths of different UEs.

For conventional communication systems, the UTRAN monitors and controls the UEs' uplink transmitting timing via a specific traffic burst structure in CONNECT mode so as to maintain uplink synchronization for each UE. But for P2P communication mode, the UTRAN is only involved in P2P link establishment procedure and not involved in the P2P communication procedure after P2P link's establishment. Therefore, during P2P communication, there is no dedicated channel between the UTRAN and the two P2P UEs, so the UTRAN cannot adjust the uplink synchronization advance for the two P2P UEs transmitting signals by using specific traffic burst to maintain uplink synchronization even if it can overhear and estimate the uplink synchronization shift of the two P2P UEs.

Referring to FIG. 3, when UE1 and UE3 transmit signals in the same uplink timeslot, the UTRAN can overhear information S1 transferred from UE1 to UE2 (to the UTRAN, S1 is considered as interference signal I1). But as described above, there is no dedicated channel between the UTRAN and UE1, so the UTRAN can't adjust UE1's transmission timing by using the traffic burst in conventional communication mode even if it can overhear information S1 and estimate UE1's synchronization shift information, which means UE1 working in P2P mode may lose uplink synchronization with the UTRAN (UE3 working in conventional mode can maintain uplink synchronization with the UTRAN with conventional mode). That is, I1 and S2 are likely to reach the UTRAN unsynchronously, which will potentially impair uplink synchronization and thus degrade the system performance.

Similarly, when UE1 and UE3 transmit signals in the same allocated uplink timeslot, UE2 can also overhear signal S2 transferred from UE3 to the UTRAN (to UE2, S2 is considered as interference I2), and interference signal I2 will also produce impact on UE2's receiving S1, which may potentially impair the P2P communication quality.

2. Interference Associated with Downlink Timeslot between P2P Link and Conventional Link FIG. 4 illustrates the interferences between P2P link and conventional link in a P2P-enabled TD-SCDMA system when the P2P link is associated with downlink timeslot. It is assumed that UE1 and UE2 work in P2P mode and UE3 works in conventional mode, wherein UE1's Rx timeslot is associated with UE3's downlink timeslot, that is: UE1 and UE3 are allocated in the same downlink timeslot to respectively receive signals from UE2 and the UTRAN. S3 is the P2P link information from UE2 to UE1 via direct link (taken as BACKWARD link) and S4 is downlink information from the UTRAN to UE3 via downlink, furthermore, S3 and S4 are associated with the same uplink timeslot but with different spreading codes.

In FIG. 4, the downlink information S4 transmitted from the UTRAN to UE3 may produce interference to other UEs who share the same downlink timeslot with UE3 but use different spreading codes to receive signals. Such interference is called multi-access interference (MAI).

Referring to FIG. 4, when UE1 and UE3 receive signals in the same allocated downlink timeslot, UE1 can overhear information S4 transferred from the UTRAN to UE3 via downlink (to UE1, S4 is considered as interference signal I4), and generally the transmission power of signals from the UTRAN is relatively strong, so the interference signal I4 is likely to impair the direct communication quality seriously.

Similarly, when UE1 and UE3 receive signals in the same allocated downlink timeslot, UE3 can also overhear information S3 transferred from UE2 to UE1 (to UE3, S3 is considered as interference signal I3, and meanwhile UE2 can be taken as the pseudo-UTRAN of transmission information in downlink timeslot), and the interference signal I3 will impair the communication quality of UE3 near UE2 and other UEs in the same timeslot as UE3 to receive signals.

3. Interference between P2P Direct Link Pairs

FIG. 5 illustrates the interferences between two P2P direct link pairs in a P2P-enabled TD-SCDMA system, wherein a UE in one of the two P2P link pairs receive transmit signals to another UE in another P2P link pair. Assume that UE1 and UE2 work in one P2P link pair while UE3 and UE4 in another P2P link pair.

Because the P2P link pairs are symmetrical, in the associated timeslot, signal S5 or S6 from UE1 to UE2 will become interference I5 or I6 to UE4 who is receiving signals from UE3. Obviously these interferences may also greatly impair the direct communication quality.

As noted above, after P2P link is introduced in conventional TD-SCDMA systems, there exist 6 possible interference signals I1, I2, I3, I4, I5 and I6. Depending on whether the UTRAN is involved, the above 6 interference signals can be divided into two types. The first type includes interferences between the UEs, such as I2, I3, I5, and I6; and the second type includes the interferences with UTRAN involved, such as I1 and I4.

To guarantee the communication quality of a P2P-enable TD-SCDMA communication system, effective methods needs to be researched to cancel the above 6 interferences (it's better to achieve that without changing the physical layer structure of existing communication systems). Among the above 6 interference signals, the first type can be reduced or cancelled by efficiently limiting the radio range supported by P2P and adopting intelligent radio resource control scheme, while interference signal I1 can be cancelled as described in a patent application entitled "A Method and Apparatus for Uplink Synchronization Maintenance with P2P Communication in Wireless Communication Networks," filed by KONINKLIJKE PHILIPS ELECTRONICS N. V., on Mar. 7, 2003, Attorney's Docket No. CN030004, application Ser. No. 0319894.5, the disclosures of which are hereby incorporated by reference. As for interference signal I4 of the second type, there is no effective solution yet now.

From the foregoing interference analysis, it can be seen that interference signal I4 is introduced by the UTRAN's transmitting signals to UE3 via the downlink to UE1 in the same downlink timeslot as UE3. Usually, the signal transmission power of the UTRAN is relatively strong enough that all UEs sharing the same downlink timeslot in the same cell can overhear the signal transmitted, and moreover the signal is the mixed one including redundant information of many other UEs, hence, I4 can't be ignored. In UE1, UE1 must adopt MUD (multi-user detection) or JD (joint detection) to cancel the interference signal, so as to guarantee the direct communication quality.

SUMMARY OF THE INVENTION

The object of the present invention is to provide a method and apparatus for supporting P2P communication in TDD CDMA communication systems, so as to reduce interferences to the UE caused by downlink signal from conventional communication transmitted in the same downlink timeslot as the UE during direct communication.

To achieve the above object, a method for supporting a UE to perform P2P communication in TDD CDMA communication systems in accordance with the present invention, comprising: receiving signals transferred by network system via downlink control channel; acquiring the timeslot allocation information according to the received signals; acquiring the spreading code allocation information of other active UEs allocated in the specific downlink timeslot associated with the direct link used by the UE, according to the signals transferred via downlink control channel; and reducing the interference to the UE caused by downlink signals in conventional communication during P2P communication, according to the acquired timeslot allocation information and spreading code allocation information.

A method for supporting P2P communication between two UEs, performed by network system, in TDD CDMA communication systems in accordance with the present invention, comprising: sending the timeslot allocation information to the two P2P UEs via downlink control channel; generating spreading code allocation information corresponding to each downlink timeslot in said timeslot allocation information; and sending the said spreading code allocation information to these two UEs respectively so as to synchronize the P2P communication signal of each of the two UEs with the signals from network system.

BRIEF DESCRIPTION OF THE ACCOMPANYING DRAWINGS

FIG. 6 is a schematic diagram illustrating the timeslot allocation information in accordance with the present invention;

FIG. 7 is a schematic diagram illustrating the spreading code allocation information in accordance with the present invention;

DETAILED DESCRIPTION OF THE INVENTION

Figure 1:
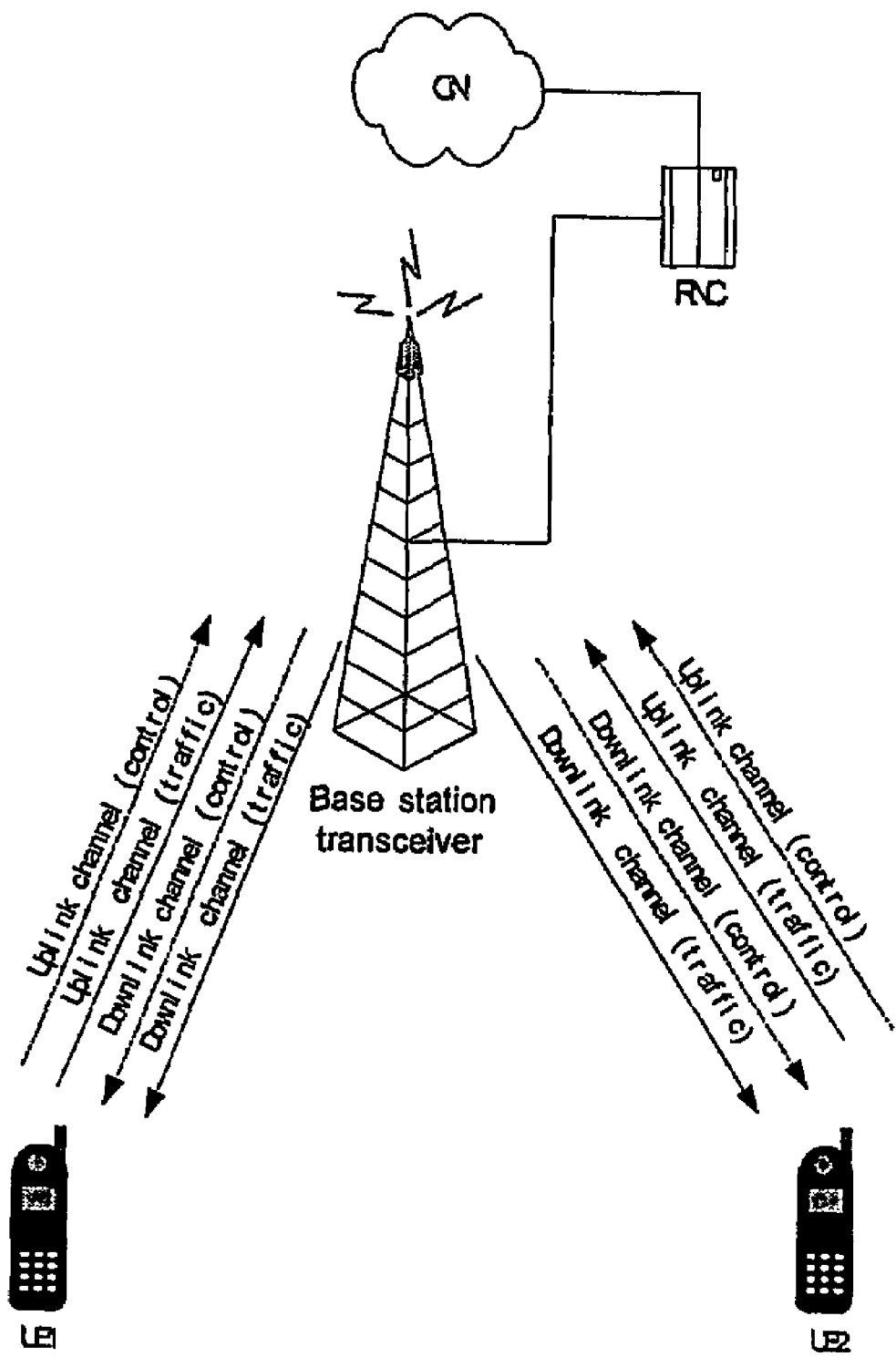
FIG. 1 is a schematic diagram illustrating two UEs communicate through the relaying of base stations in conventional communication mode.
Figure 2:
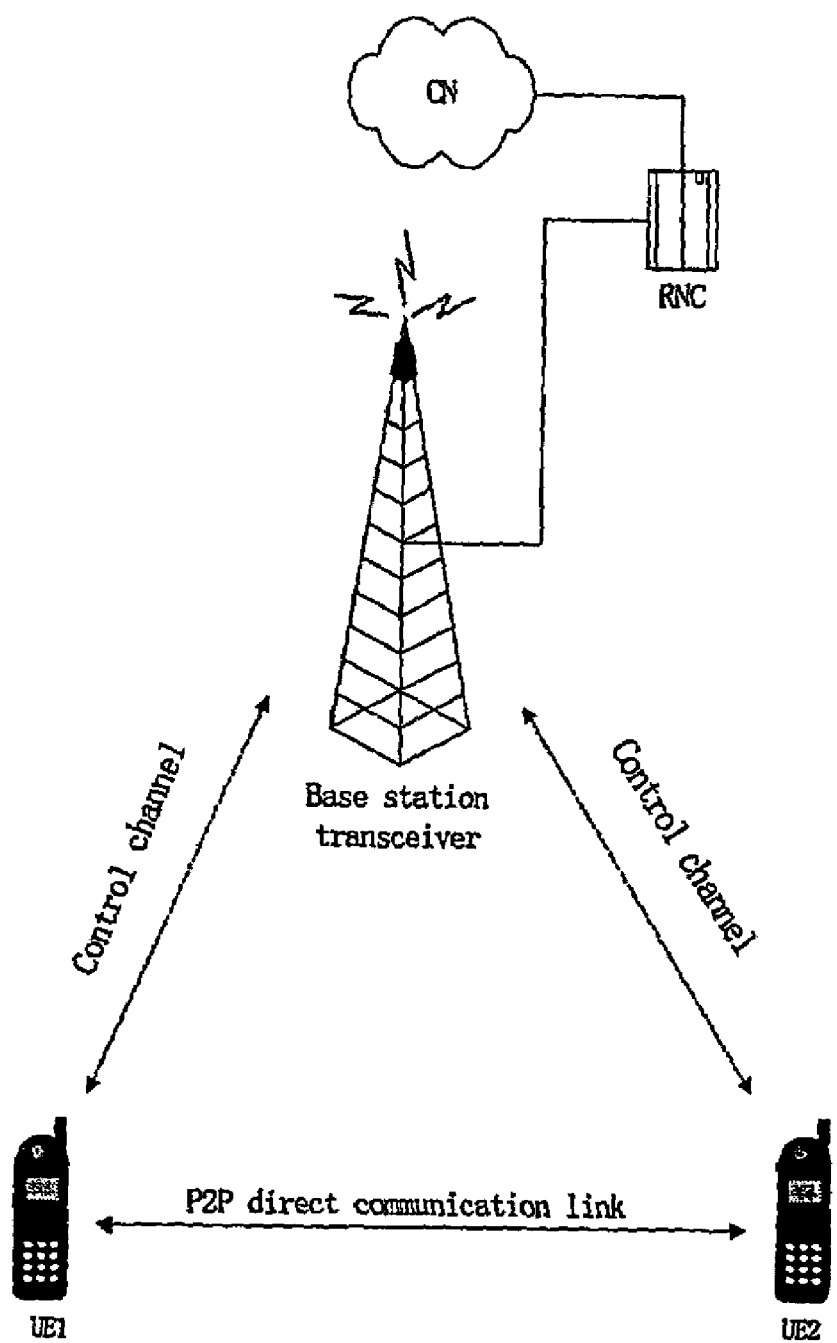
FIG. 2 is a schematic diagram illustrating the P2P communication mode between two UEs.
Figure 3:
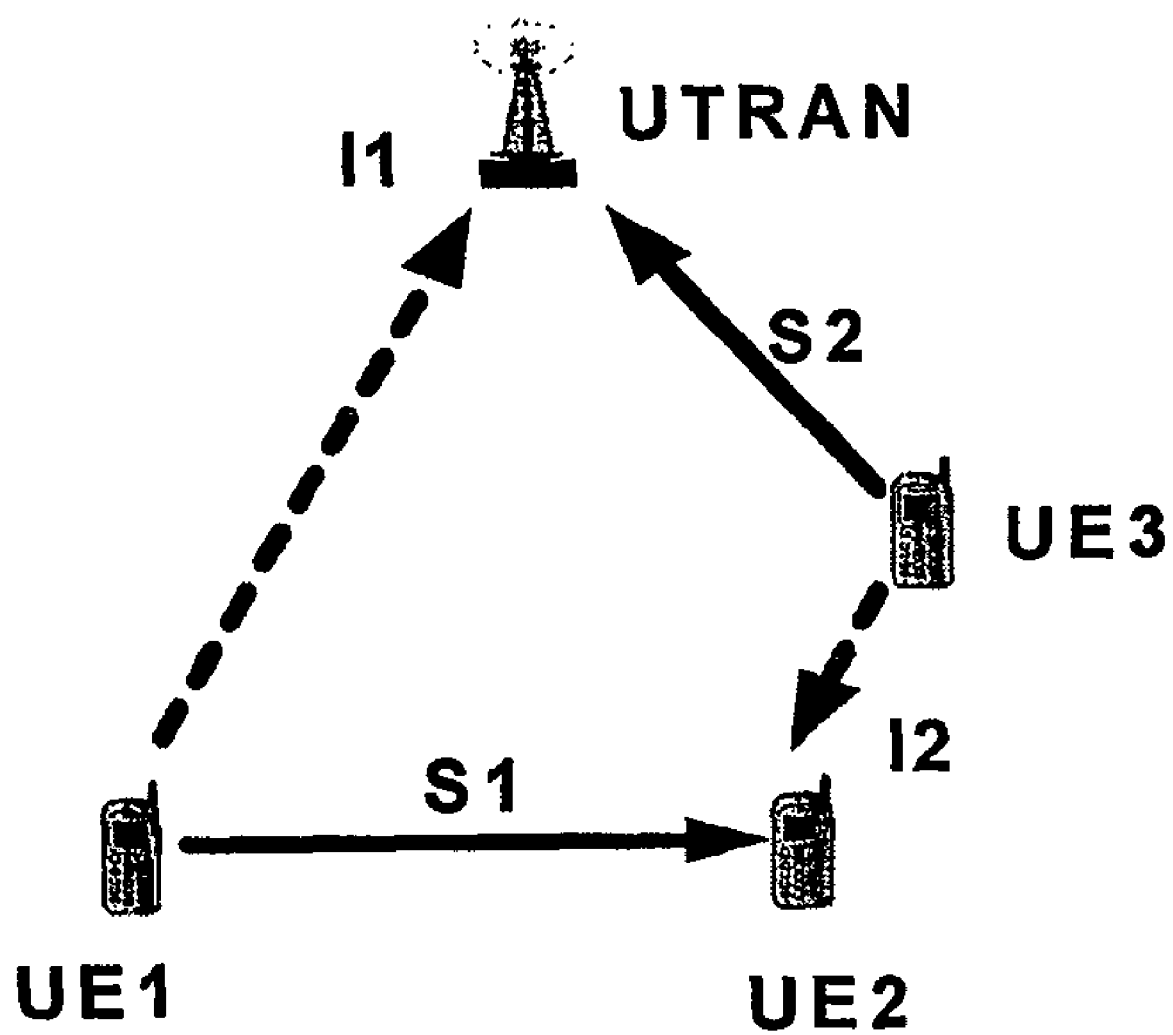
FIG. 3 is a schematic diagram illustrating the generation of interference signals between direct link and conventional link employing uplink timeslot to communicate, in a P2P-enabled TD-SCDMA system.

According to the analysis to interference signals in a P2P-enabled TD-SCDMA communication system as above, the present invention primarily focuses on addressing the problem of interference signals from conventional downlink for a Rx UE in P2P communication.

In fact, an advanced receiver has been widely used in the UTRAN of TD-SCDMA communication systems, i.e. using MUD or JD method to cancel MAI interference, as disclosed in detail in the article entitled "Multi-user Detection for DS-CDMA Communication," written by S. Moshavi, in *IEEE Commun. Mag.*,October 1996, page 124-136, and the article entitled "Zero forcing and minimum mean-square-error equalization for multiuser detection in code division multiple access channels," written by A. Kelein, G. K. Kaleh, in *IEEE Trans. Vehicular Tech.*,Vol. 45, No. 2, May 1996, pp 276-287, the disclosures of which are hereby incorporated by reference. But to apply interference canceling method like MUD or JD in the receiver of a UE, two conditions needs to be satisfied in advance:

1. acquire the spreading code information of all active UEs allocated in the same timeslot as the UE;
2. when receiving signals from direct link, the UE in direct mode should maintain synchronization with associated downlink signals from the UTRAN (the complexity of implementing the receiver can be effectively simplified only with signal synchronization).

Discussions will respectively be given below to the above two conditions:

1. How to Obtain Spreading Code Allocation Information

In a TD-SCDMA communication system taken as an example, the spreading codes used by all active UEs are controlled by the base station subsystem UTRAN. During communication, RF signals convey information in form of frame. Every RF frame is divided into two sub-frames, and every sub-frame has 7 timeslots. Each UE allocated in the same timeslot transmits or receives signals using different spreading code allocated by the base station subsystem. Downlink control channel such as BCCH (Broadcast Control CHannel), has fixed position in each radio frame or sub-frame, and a UE can receive information from downlink control channel no matter working in conventional mode or P2P mode, so the UE can obtain the spreading code allocation information of all UEs sharing the same timeslot, according to the control information transferred from the UTRAN via downlink control channel.

Wherein spreading code allocation information includes two parts: (i) the timeslot allocation information in each frame or sub-frame about whether each timeslot is to be used in uplink or downlink; (ii) the spreading code allocation information associated with each allocated downlink timeslot.

In the embodiments of the present invention, the above timeslot allocation information and spreading code allocation information respectively store the involved information into the corresponding timeslot allocation map and spreading code allocation map through mapping, especially:

(1) About the Timeslot Allocation Information

In a TD-SCDMA communication system taken as an example, each sub-frame has 7 timeslots, denoted as TS0-TS6, so an octet with 8 bits can be used to map the 7 timeslots in a sub-frame in timeslot allocation map.

Wherein a timeslot corresponds to a bit in the octet. As FIG. 6 shows, TS0-TS6 respectively corresponds to Bit6-Bit0 in the octet, while Bit7 is reserved. For each bit in Bit6-Bit0, assume that its corresponding timeslot is to be used as downlink timeslot when it is 1, and as uplink timeslot when it is 0. In TD-SCDMA systems, TS0 is always allocated as downlink and TS1 as uplink, so let Bit6=1 and Bit5=0.

(2) About the Spreading Code Allocation Information Associated with each Allocated Downlink Timeslot After the timeslots in an RF frame or sub-frame are allocated, the UTRAN can accordingly generates the spreading code allocation information associated with each associated downlink timeslot according to the downlink timeslots included in the sub-frame. A TD-SCDMA system is also taken as an example in the following.

In this communication system, a downlink timeslot may have totally up to 16 spreading codes for different UEs or different codes in one UE to use. So 16 bits are needed to represent how each spreading code in a downlink timeslot is used, that is, two octets are needed to represent the spreading code allocation information. It can be leant from the foregoing description that TS1 is always used as uplink in the 7 timeslots included in each sub-frame, therefore at most 6 timeslots in each sub-frame can be used as downlink, thus totally 12 octets are needed to represent how the spreading codes of the 6 timeslot are used.

The following embodiment will describe the spreading code allocation information included in a downlink timeslot. Assume that Bit4=0 and Bit1=0 in the timeslot allocation map shown in FIG. 6, that is, TS2 and TS5 are used as downlink timeslots, 4 octets are required to be included in the spreading code allocation map that corresponds to FIG. 7. Wherein the first two octets correspond to the allocation information of each spreading code in TS2 and the second two octets correspond to that in TS5. The part with lighter background color indicates the first two octets, wherein Bit15~Bit0 respectively correspond to the information about spreading codes Code15~Code0 in TS2 to be used by 16 UEs or codes at most; while the part with deeper background color indicates the second tow octets, wherein Bit15~Bit0 respectively correspond to the information about spreading codes Code15~Code0 in TS5 to be used by 16 UEs or codes at most. To each bit of the four octets in the above two groups corresponding to each spreading code, it can be defined as: when the bit corresponding to the spreading code is 1, it represents that the spreading code is used by a UE in the corresponding timeslot; when the bit corresponding to the spreading code is 0, it represents that the spreading code is not allocated to any UE in the corresponding timeslot yet. For instance, when Bit8 and Bit0 of the two octets in the first group are 1 while other bits are all 0, it represents only the spreading codes corresponding to Bit8 and Bit0 are occupied in TS2 corresponding to the first group, while other spreading codes are not allocated to any UE yet.

As described above, through mapping the allocation information of each timeslot in the sub-frame and the allocation information of each spreading code included in each downlink timeslot in the sub-frame into the timeslot allocation map and spreading code allocation map, the UTRAN can send the information included in the timeslot allocation map and spreading code allocation map to each UE via downlink control channel, so that the UE can obtain the timeslot allocation information and the spreading code allocation information associated with downlink timeslot.

Of course, the UE can also obtain the timeslot allocation information and the spreading code allocation information associated with uplink timeslot in a similar way, if needed.

2. Maintain Synchronization with Associated Downlink Signals from the UTRAN when a UE in Direct Mode is Receiving Signals from Direct Link In conventional TD-SCDMA systems, the downlink mixed signals transmitted by the UTRAN should reach the UE synchronously if the multi-path delay effect is ignored. But in a P2P-enabled TD-SCDMA system, there is great difference between the transmission path of the useful signal S3 from a P2P UE and that of the interference signal I4 from the UTRAN (referring to FIG. 4), so their arriving time may be quite different, i.e.: when UE1 in direct mode is receiving signal S3 over direct link, it can't be guaranteed to keep synchronization with downlink signal I4 from the UTRAN. In this case, S3 and I4 can't arrive at UE1 at the same time, so the complexity of implementing channel estimation or JD (joint detection) will be increased greatly due to time unsynchronization although conventional JD method can still be employed to cancel Interference signal I4 in UE1, even if UE1 can obtain the timeslot allocation information and spreading code allocation information transmitted by the UTRAN via downlink control channel.

To greatly simplify the operation of the receiver in UE1 and effectively cancel downlink interference signal I4, how to implement synchronization between direct link signal S3 and interference signal I4 at Rx UE1, arises as an important step to guarantee P2P communication quality.

Figure 4:
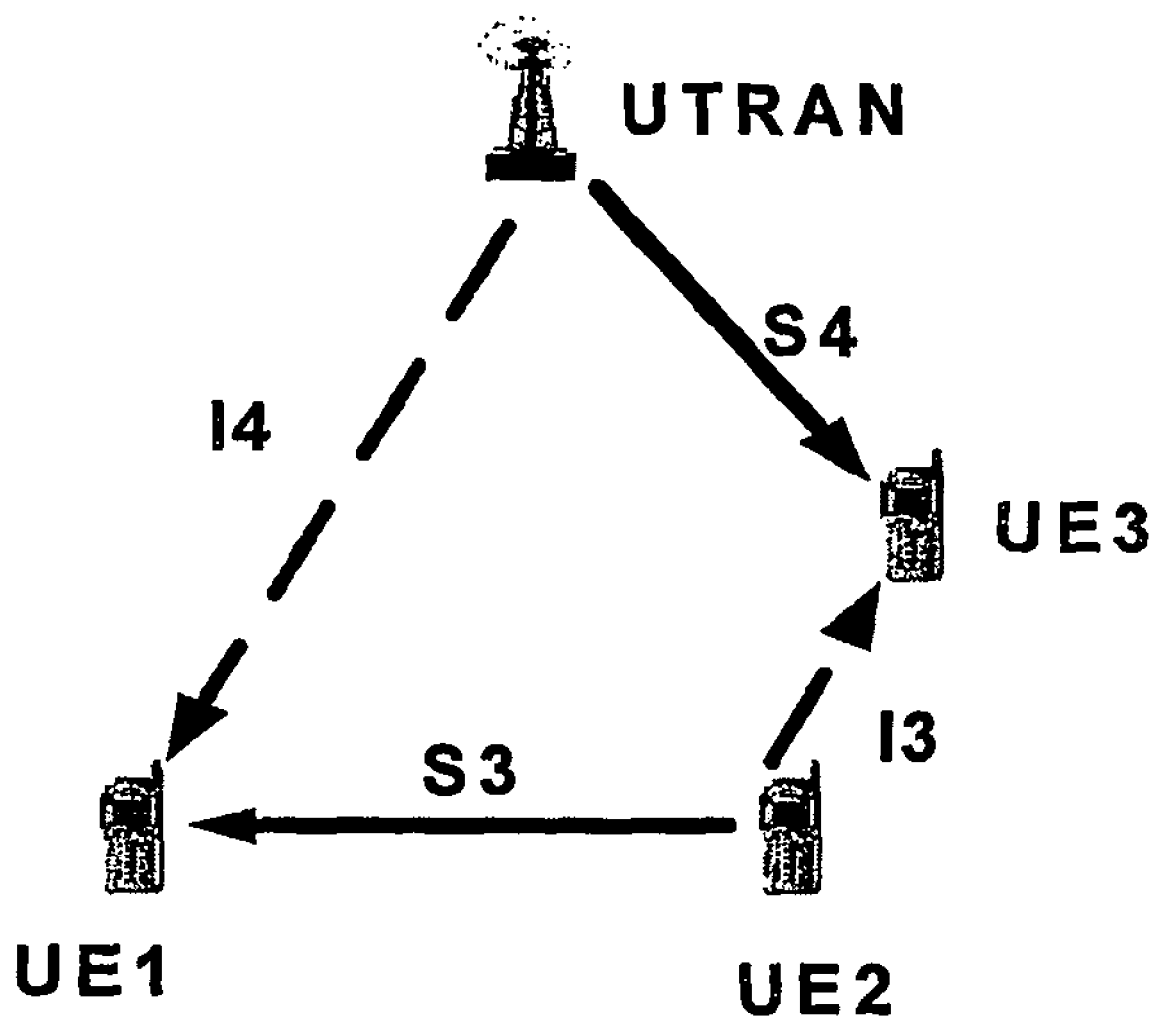
FIG. 4 is a schematic diagram illustrating the generation of interference signals between direct link and conventional link employing downlink timeslot to communicate, in a P2P-enabled TD-SCDMA system.
Figure 5:
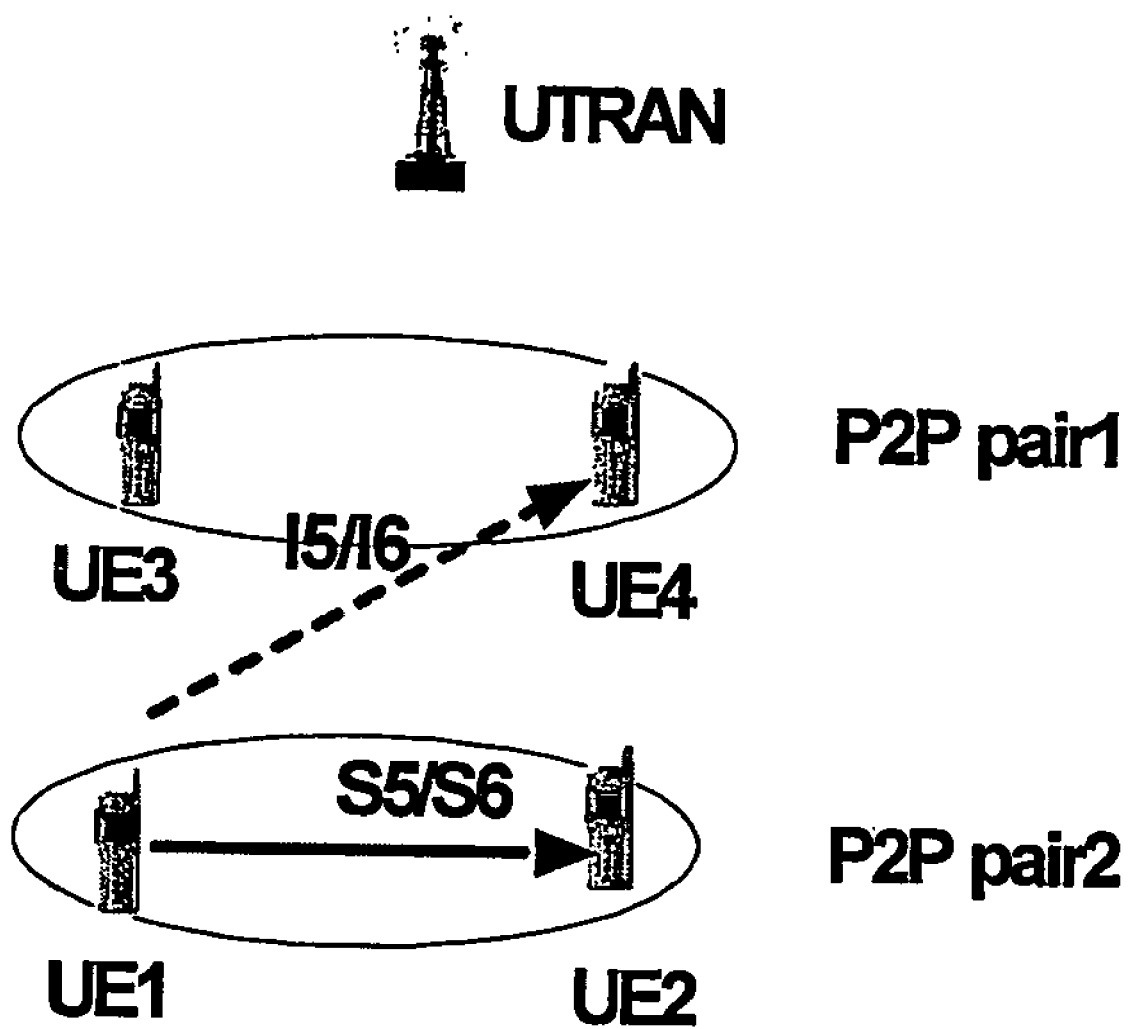
FIG. 5 is a schematic diagram illustrating the generation of interference signals between two direct link pairs in a P2P-enabled TD-SCDMA system.

As FIG. 4 shown, in the case that the useful signal S3 and interference signal I4 can't arrive at UE1 synchronously, there are two methods for them to arrive at UE1 synchronously: the first is to adjust the TA for the UTRAN to transmit signal I4 so that signal I4 transmitted by the UTRAN and signal S3 transmitted by UE2 can arrive at UE1 synchronously; the second is to adjust the TA for UE2 to transmit signal S3 so that signal S3 transmitted by UE2 and signal I4 transmitted by the UTRAN can arrive at UE1 synchronously. Wherein it's impossible to realize the first method by adjusting the UTRAN's transmission TA for I4 and S3 to arrive at UE1 synchronously, because there are usually several P2P link pairs using the same downlink timeslot during communication process, which can't guarantee downlink interference signal I4 to be synchronized with signals (e.g. S3) received by the UEs in P2P communication just by adjusting a common transmission TA for the UTRAN to transmit signals. So, the TA adjustment must be done at UE2 for transmitting useful signal S3 to guarantee that each UE in direct mode can maintain synchronization with the associated downlink signals from the UTRAN when receiving signals from different direct links.

Figure 8:
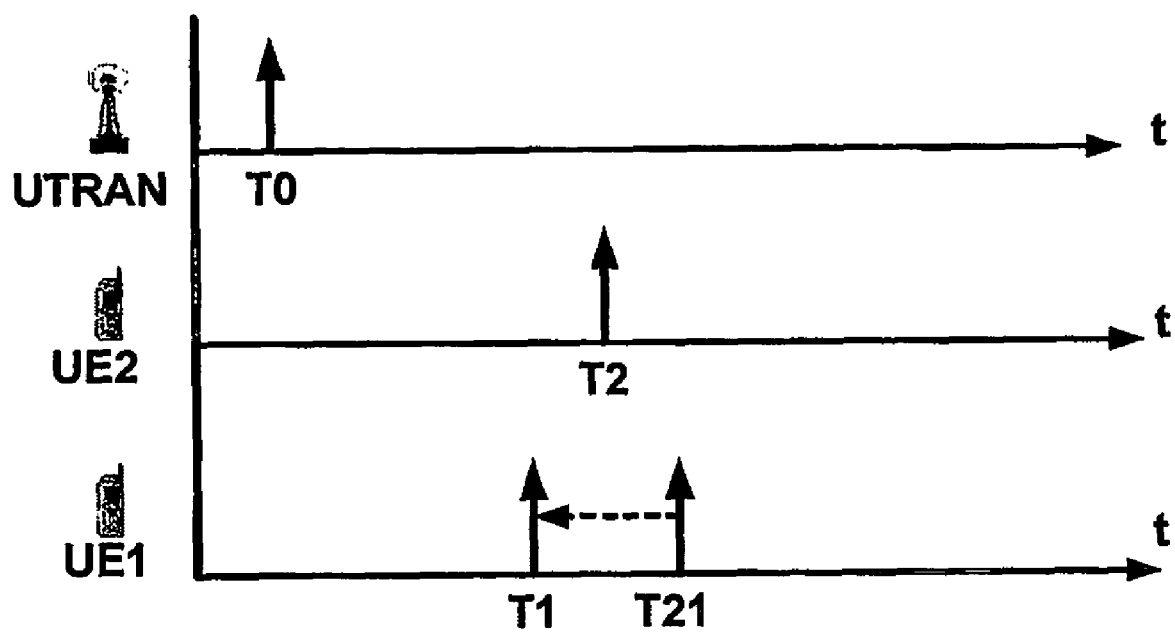
FIG. 8 is a schematic diagram illustrating the time relationship between receiving downlink signals from the UTRAN and that from UE2 respectively at UE2 and UE1 with the UTRAN as the time benchmark when downlink timeslot is employed to communicate.
Figure 9:
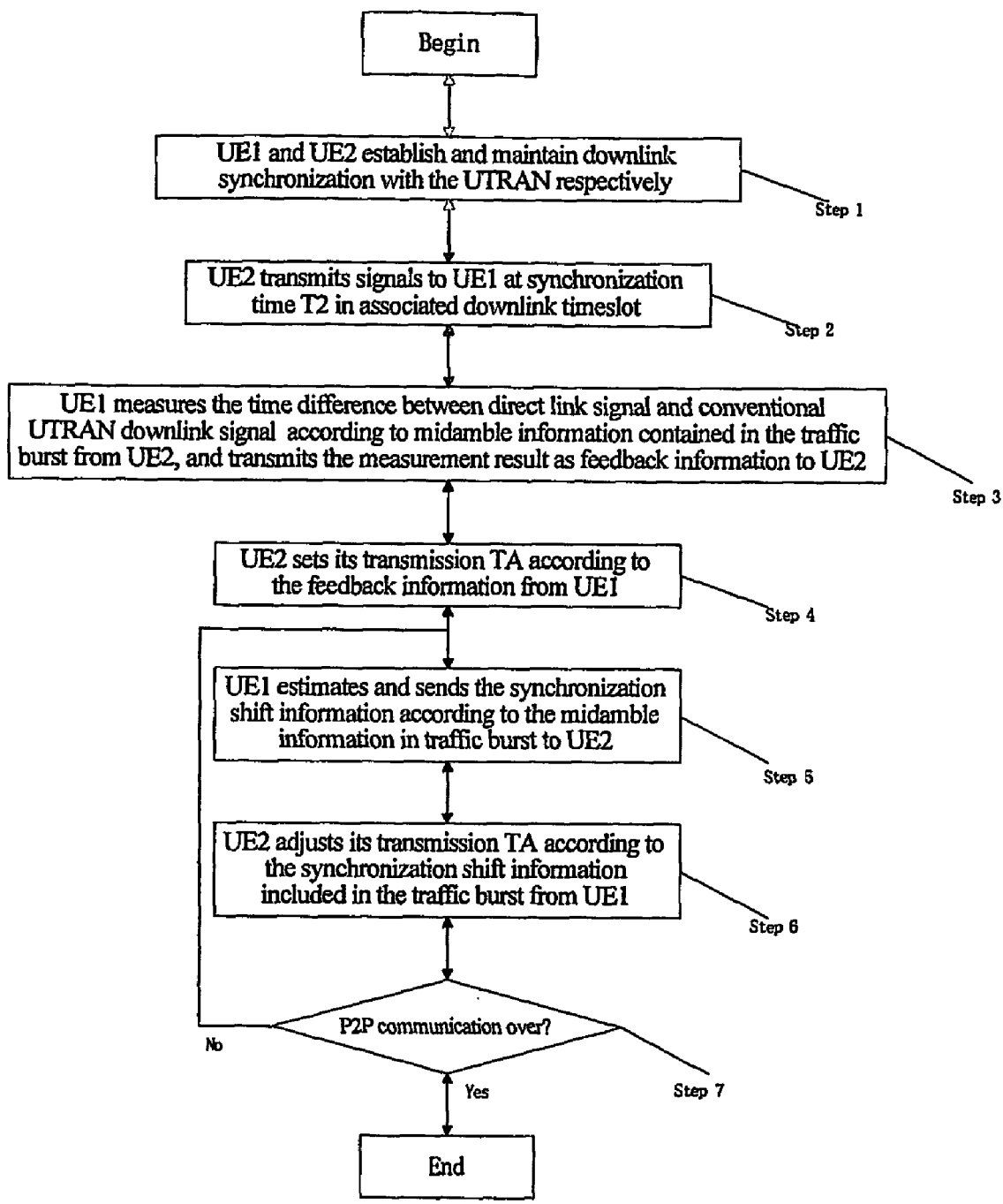
FIG. 9 is a schematic diagram illustrating the method to be performed in the present invention for downlink synchronization for an Rx UE in direct mode.

Before describing the above synchronization procedure in conjunction with FIG. 8, two issues need to be clarified in advance:

(i) Establish and Maintain Synchronization with the UTRAN in Conventional Communication Mode During cell search phase, each UE firstly establishes downlink synchronization with the UTRAN in conventional way, and then maintains downlink synchronization with the UTRAN by tracking the pilot channel in the sub-frame and taking the detected pilot channel as the time reference in its sub-frame.

(ii) Maintain Synchronization with Associated Downlink timeslots in P2P Communication Mode When UE1 and UE2 are in P2P direct mode, there is a dedicated channel between them, and the traffic burst structure of the dedicated channel is the same as that in conventional TD-SCDMA communication systems, which means that the power control information and synchronization shift information are also included in the traffic bursts of FORWARD link and BACKWARD link in the P2P dedicated channel. In conventional TD-SCDMA communication systems, the synchronization shift information included in traffic burst can be used to maintain uplink synchronization at the UTRAN, similarly the synchronization shift information included in traffic burst of direct link can be used by the P2P UEs to maintain synchronization with associated conventional downlink when receiving direct link signals in P2P communication.

From the above clarification it can be seen that each UE respectively establishes downlink synchronization with the UTRAN in conventional way at the beginning of communication establishment (cell search phase), so two UEs can have a common time benchmark when establishing P2P communication, to determine synchronization between direct link signals and downlink signals. Meanwhile, the traffic burst of P2P dedicated channel contains the same synchronization shift information as in conventional mode, so the UE can set and adjust its signal transmission TA by using the synchronization shift information during P2P establishment and communication procedure, to guarantee synchronization between direct link signals and downlink signals.

Descriptions will be given below to synchronization procedure between direct link signals and downlink signals at the Rx UE, in conjunction with FIG. 8 and FIG. 4, wherein for UE1 the useful signal S3 and interference signal I4 share the same downlink timeslot.

First, taking the UTRAN as the common benchmark, the time relationship between the receiving time for each UE to receive signals and the common benchmark at the UTRAN is illustrated in FIG. 8. T0 is the downlink transmitting time benchmark in the associated downlink timeslot at the UTRAN, T1 and T2 are the related receiving time points at UE1 and UE2 respectively. UE1 and UE2 can identify T1 and T2 by finding and tracking the pilot channel from the UTRAN as described above. The durations $T_{UTRA-UE2}$ (equal to T2-T0) and TUTRAN-UE1 (equal to T1-T0) are signal transmission time from the UTRAN to UE1 and UE2 respectively. TUE2-UE1 (equal to T21-T2) is signal transmission time from UE2 to UE1, provided that UE2 sends signal to UE1 at T2 and the signal arrives at UE1 at T21, wherein T21 should overlap with T1 so as to guarantee the useful signal S3 and interference signal I4 can arrive at UE1 at the same time.

Then, UEI estimates the TA by estimating the channel impulse response of each midamble transmitted by UE2, and includes the estimated TA as synchronization shift information in the traffic burst from UE1 to UE2. The traffic burst contains the midamble to be used for estimating the TA, so UE1 and UE2 can estimate and adjust signal transmission TA any time, even if the two UEs are both in mobility.

The above conventional downlink synchronization procedure addressing direct link can be summarized as follows:

(1) UE1 and UE2 establish and maintain downlink synchronization with the UTRAN respectively UE1 and UE2 establish downlink synchronization during cell search, and maintain downlink synchronization by tracking the pilot channel (step 1).

(2) UE2 determines its transmitting time

UE2 sets time T2 as its transmitting time for transmitting signals to UE1 in associated downlink timeslot during direct link establishment procedure (step 2).

(3) UE1 measures the time difference between direct link signal and downlink signal During direct link establishment procedure, when receiving the traffic burst transmitted by UE2 at T2, UEI measures the time difference of $T_{UTRAN-UE2}+T_{UE2-UE1}-T_{UTRAN-UE1}$ (T21-T1) according to the midamble information contained in the traffic burst, and transmits the measurement result as feedback information to UE2 (step 3).

(4) UE2 sets its transmission TA

UE2 sets its transmission TA according to the feedback information from UE1 and adjusts its time to transmit signals according to this TA (step 4).

(5) UEI estimates and sends synchronization shift information to UE2 UE1 estimates the synchronization shift information by evaluating the channel impulse response of each midamble from UE2 and sets the synchronization shift information in the traffic burst to be transmitted from UE1 to UE2 (step 5).

(6) UE2 adjusts its transmission TA

UE2 adjusts its transmission TA according to the synchronization shift information included in the traffic burst from UE1 (step 6).

(7) Iterate step 5 and step 6

Judge whether P2P communication is ended (step 7). If the direct communication is not ended yet, the above step 5 and step 6 will be iterated continuously to keep direct link signal S3 to be synchronized with the associated downlink signal I4, so long as the direct link still shares the same timeslot as the downlink timeslot.

Through the above steps, the useful signal S3 from UE2 and interference signal I4 from the UTRAN can arrive at UE1 at the same time, to guarantee that UE1 can use MUD or JD algorithms to cancel downlink interference signal I4 and then to guarantee the performance of P2P-enabled TDD CDMA systems, with downlink synchronization and the acquired spreading code allocation information.

Of course, in the case when two UEs in direct communication mode are very close to each other, i.e.: when the receiving time points T1 and T2 are nearly equal, the time difference between direct link signal S3 and downlink signal I4 arriving at UE1 can almost be ignored. At this time, the above synchronization procedure can be omitted, and only spreading code allocation information is needed. UE1 can cancel the negative effect caused by interference signal I4 through JD.

Moreover, it should be noted that setting and adjusting the transmission TA by UE2 can only guarantee that the useful signal S3 and interference signal I4 arrive at UE1 at the same time, but can't guarantee that the useful signal S4 and interference signal I3 in FIG. 4 arrive at UE3 at the same time, thus UE3's receiver can't effectively cancel the effect caused by interference signal I3 in UE3 (or cancel I3's effect based on increasing complexity by using asynchronous JD method) according to the acquired spreading code allocation information. Fortunately, in practical communications, when UE3 extracts the desired information from S4 by using conventional synchronous JD method, its most interferences are from the received mixed signal S4, and interference signal I3's effect to the useful signal S4 can be ignored at this time.

The above method for supporting P2P communication in downlink timeslot in TD-SCDMA systems as proposed in the present invention, can be implemented in computer software, or hardware, or in combination of both software and hardware.

Beneficial Results of the Invention

As described above, referring to the method and apparatus for supporting P2P communication in TD-SCDMA systems provided in the present invention, a UE in direct communication mode can acquire spreading code allocation information via downlink, thus the UE can effectively cancel the interference caused by the downlink signals transferred in the same timeslot in conventional communication, by utilizing the spreading code allocation information used by other UEs allocated in the same downlink timeslot, with methods like MUD or JD.

Furthermore, referring to the method and apparatus for supporting P2P communication in TD-SCDMA systems provided in the present invention, some steps are adopted to keep direct link signals and downlink signals in the associated timeslot synchronized, which greatly simplifies the operation of the UE to cancel downlink signal interference according to the spreading code allocation information, and simplifies the hardware setting of the UE's receiver.

Although the method and apparatus for supporting P2P communication in TD-SCDMA systems provided in the invention has been shown and described with respect to exemplary embodiments of TD-SCDMA, it should be understood by those skilled in the art that the communication method and apparatus are not limited hereof, but also suitable to other TDD CDMA systems.

It is also to be understood by those skilled in the art that the method and apparatus for supporting P2P communication in TD-SCDMA systems disclosed in this invention can be modified considerably without departing from the spirit and scope of the invention as defined by the appended claims.

What is claimed is:

1. A method for supporting P2P (Peer to Peer) communication between two user equipments in TDD CDMA systems, performed by user equipment, comprising:
   receiving downlink signals transferred via a control channel by a network system;
   acquiring timeslot allocation information according to the received downlink signals;
   acquiring spreading code allocation information of other active user equipments allocated in the specific downlink timeslot associated with a direct link used by the user equipments, according to the received downlink signals;
   reducing the interference caused by downlink signals transferred to the other user equipments during P2P communication according to the acquired timeslot allocation information and spreading code allocation information, wherein the interference reduction includes executing at least one of the methods Multi-User Detection (MUD) and Joint Detection (JD), and wherein at least one of the methods utilizes the spreading code information used by other user equipments in the downlink timeslot to reduce interference;
   establishing downlink synchronization with the network system and keeping downlink synchronization with the network system by tracking a pilot channel;
   in the downlink timeslot, when the user equipments transmit signals via the direct link, the steps taken by the user equipment includes:
   (i) during establishing a direct link, setting a time of transmitting signals to the other user equipment in the downlink timeslot according to a received time of transmitted signals by a network system;
   (ii) transmitting test signals to the other user equipment at the set time in the downlink timeslot;
   (iii) receiving a feedback signal from the other user equipment, which is the time difference obtained by comparing the time at which the other user equipment receives the test signals and the received time at which the network system transmits signals in the other user equipment, after the other user equipment receives the test signals;
   (iv) setting a time advance for transmitting signals to the other user equipment according to the feedback signals; and
   (v) adjusting the time at which the user equipment transmits signals to the other user equipment according to time advance, in order that the downlink signals from the network system, which are received by the other user equipment, are synchronized with the signals of the direct link from the user equipment.

2. The communication method according to claim 1, where the spreading code allocation information at least includes the spreading code information used by other user equipment in the downlink timeslot.

3. The communication method according to claim 1, further including:
   (vi) transmitting communication signals to the other user equipment at the adjusted time for transmitting;
   (vii) receiving the synchronization shift information from the other user equipment, which is the synchronization derivation estimated according to received communication signals in the other user equipment after receiving communication signals; and
   (viii) adjusting the timing advance for transmitting signals to the other user equipment according to the synchronization shift information.

4. The communication method according to claim 1, further including:
   adjusting the time at which the user equipment transmits signals to the other user equipment during P2P communication, according to the synchronization shift information from the other user equipment, in order that the communication signals transmitted by the user equipment and the downlink signals transmitted by the network system can reach the other user equipment at the same time.

5. The communication method according to claim 1 wherein when the user equipment receives signals via the direct link in the downlink timeslot, the step to be taken includes:
   calculating a difference between the time for receiving the test signals transmitted from the other user equipment and the time for receiving the signals transmitted from the network system, and sending the calculated time difference as a feedback signal to the other user equipment, when receiving test signals transmitted by the other user equipment, establishing the direct kink.

6. The communication method according to claim 5, wherein when the user equipment receives signals via the direct link in the downlink timeslot, the step to be taken further includes:
   estimating synchronization shift information of the other user equipment according to the received communication signals when a UE receives the communication signals transmitted by the other user equipment, and sending the estimated synchronization shift information to the other user equipment, while establishing the direct link.

7. The communication method according to claim 5, further includes:
   calculating synchronization shift information of the other user equipment according to the received communication signals from the other user equipment, and sending the synchronization shift information to the other user equipment, during the P2P communication.

8. A user equipment for supporting P2P (Peer to Peer) communication in TDD CDMA systems, comprising:
   a signal transceiver for receiving and transmitting radio signals;
   a timeslot allocation information acquiring means for acquiring a timeslot allocation information according to information transferred via a downlink control channel;
   a spreading code allocation information acquiring means for acquiring spreading code allocation information of other active user equipment in a specific downlink timeslot which is used when a UE is receiving signals via the direct link between the UE and the other user equipment, according to the information transferred via the downlink control channel; and
   a interference reducing means for reducing the interference caused by downlink signals transmitted from the network system to other user equipments during P2P communication according to the acquired timeslot allocation information and spreading code allocation information wherein the interference reducing means executes at least one of the methods Multi-User Detection (MUD) and Joint Detection (JD) to reduce interference, and wherein one of the methods reduce interference by using the spreading code information used by other user equipments in the downlink timeslot;

a synchronization means, for establishing downlink synchronization with the network system at a cell search phase, and maintaining downlink synchronization with the network system by tracking a pilot channel;

a transmitting means, for setting a time for transmitting signals to the other user equipment in the downlink timeslot according to a time for receiving the transmitting signals from the network system when establishing the direct link;

a test signals transmitting means, for transmitting test signals to the other user equipment at the set time in the downlink timeslot;

a feedback signal receiving means, for receiving feedback signals from the other user equipment, which is a time difference obtained by comparing the time for receiving test signals and the time for receiving the transmitting signals from the network system in the other user equipment, after the other user equipment receives the test signals;

a time advance setting means for setting a time advance for transmitting signals to the other user equipment; and a transmitting time adjusting means for adjusting, based on feedback signals, the transmitting time at which the user equipment transmits signals to the other user equipment according to the time advance, so that downlink signal transferred via the network system, which are received by the other user equipment, are synchronized with the signals transferred via the direct link from the user equipment.

9. The user equipment according to claim 8, wherein the spreading code allocation information at least includes the spreading code information used by other user equipments in the downlink timeslot.

10. The user equipment according to claim 8, further includes:
   a synchronization shift information receiving means for receiving a synchronization shift information from the other user equipment, which is a synchronization derivation estimated by the other user equipment after receiving communication signals, according to received communication signals; and
   a transmitting time adjusting means for adjusting, based on synchronization shift information, a timing advance for transmitting signals to the the other user equipment according to synchronization shift information.

11. The user equipment according to claim 8, further includes:
   a feedback signal generating means, for calculating a difference between the time for receiving test signals and the time for receiving signals transmitted from the network system, and sending the calculated difference as a feedback signals to the other user equipment when receiving the test signals transmitted by the other user equipment, while establishing the direct link.

12. The user equipment according to claim 11, further includes:
   a synchronization shift information generating means, for estimating synchronization shift information of the other user equipment according to communication signals when a UE receives communication signals transmitted by the other user equipment, and sending the estimated synchronization shift information to the other user equipment.

* * * * *